(No Model.)

R. ADLUNG.
PNEUMATIC PUMP.

No. 349,777. Patented Sept. 28, 1886.

Witnesses:
J. Weller
T. A. Rae

Inventor:
R. Adlung
H. H. Hadden
Atty.

UNITED STATES PATENT OFFICE.

REINHOLD ADLUNG, OF PANKOW, GERMANY.

PNEUMATIC PUMP.

SPECIFICATION forming part of Letters Patent No. 349,777, dated September 28, 1886.

Application filed October 28, 1884. Serial No. 146,783. (No model.)

*To all whom it may concern:*

Be it known that I, REINHOLD ADLUNG, of Pankow, in Germany, have invented a new and useful Improvement in Pneumatic Pumps, of which the following is a specification.

My invention has for its object to provide a cheap and convenient appliance for producing a vacuum, and is chiefly intended for the use of dentists, surgeons, and physical and chemical laboratories.

Figure 1:
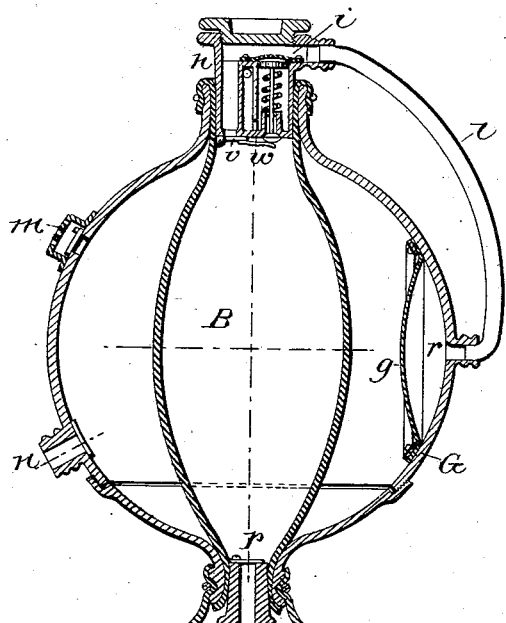
Figure 2:
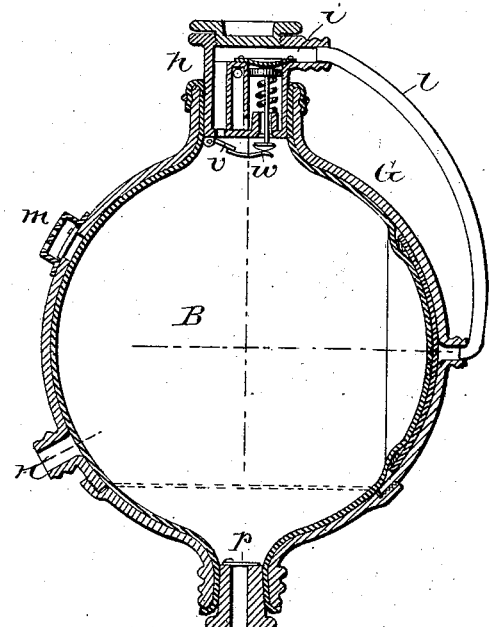
Figure 3:
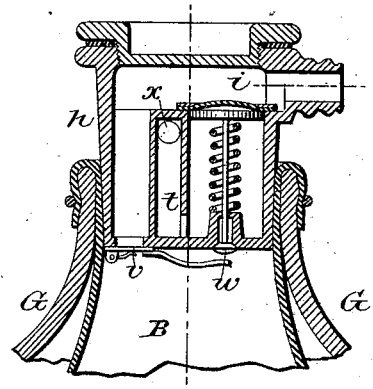

In the accompanying drawings, Figure 1 is an axial section of a pump embodying my invention; Fig. 2, an axial section of the principal parts in operation, while Fig. 3 shows a detail, and Fig. 4 a modification.

The invention chiefly comprises a rigid casing, G, an expansible displacer, B, placed in the said casing, inlet and outlet valves, and means for operating the valves.

To the casing G, composed of two parts united by a screw-joint, is attached an elastic ball, A, provided with a suction-valve, s.

The casing G is provided with two valves, m and n, for the inlet and outlet of air, n being adapted to open inside by suction, while the valve m is a discharge-valve for atmospheric air.

The casing G contains an elastic displacer, B, preferably of india rubber, communicating at the bottom with the ball A through a valve, p, and at the top with the atmosphere by a peculiarly-constructed valve mechanism, which is shown in detail by Fig. 3.

Figure 4:
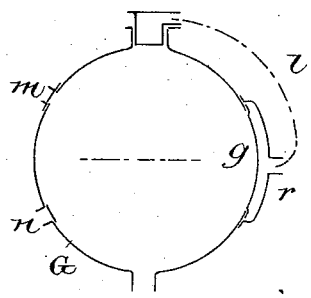

To the inside of the rigid casing G is fixed an elastic plate, g, so as to form a small compression-chamber, r, which communicates with the upper valve mechanism by a pipe, l. (Represented in the drawings by a dotted line.) The outer wall of the chamber r may either be formed by the casing G, as shown in Fig. 1, or by a removable lid, as indicated by Fig. 4, in which case the casing G has a correspondingly large opening.

The valve apparatus shown in Fig. 3 comprises a valve-box, h, carrying two valves, v and w, and the flexible membrane i, adapted to act on the valves v and w at the required moment.

The apparatus works as follows: If the ball A is compressed, the compressed air passes through valve p into the displacer B and expands the same. The air situated between B and the casing G passes through valve m into the atmosphere. If the displacer is sufficiently expanded, a pressure is exerted on the elastic plate g and transmitted through the air in the chamber r to the membrane i in the valve-box h by the elastic connection l. This pressure opens the valve w and permits the compressed air in the displacer B to escape through port t and aperture x into the atmosphere.

For the purpose of maintaining the valve v open after the compression in the chamber r has ceased, the valves w and v are so connected with each other that in the lowest position of the valve w the valve v is open. The pressure in B now acts on the upper side of the diaphragm i, and as the valves v and w are completely balanced by means of springs, they are constantly kept open until the pressure in B is equal to that of the atmosphere. Only a fresh compression of the ball A or the closing pressure of the springs will press the valves v and w against their seats, so as to interrupt communication between B and h. The displacer B, expanded by the internal air-pressure, has forced the air contained in G through valve m toward the outside, and is in a state of tension. If, now, the valves v and w are opened, as above described, the displacer B is contracted and a vacuum is produced between the latter and the casing G. The vacuum thus produced may be transmitted to a vacuum-reservoir, and increased by alternately compressing the ball A and allowing the same to expand.

The details of construction may be modified in various manners. For instance, the conical valves and flaps, as represented, may be replaced by lip-valves or other well-known closing devices, and the valve mechanism arranged on the exterior may be placed in the interior of the displacer B.

The vacuum apparatus described is conspicuous by its simplicity and the absence of frictional surfaces which would require lubrication.

What I claim is—

1. In vacuum-pumps with elastic diaphragm, the combination of a rigid casing, G, having a suction-valve, n, discharge-valve m, and diaphragm g, forming auxiliary air-chamber r, and adapted to be compressed by the expansion of the displacer B, with an elastic displacer, B, inclosed by the casing, an air-compressing ball, A, communicating with the displacer by a discharge-valve, p, and a valve mechanism communicating with the inside of the displacer B, with the auxiliary air-chamber r, and with the atmosphere, the said valve mechanism being controlled by the pressure in the auxiliary air-chamber r, and adapted to establish communication between the displacer and the atmosphere when the chamber r is compressed, substantially as described.

2. In vacuum-pumps with elastic diaphragm, the combination of casing or shell G with displacer B, air-chamber r, valve-casing h, connected with chamber r, and having a port, t, and outlet x, valves v and w, and flexible diaphragm i, substantially as and for the purpose described.

In testimony whereof I have signed this specification in the presence of two subscribing witnesses.

REINHOLD ADLUNG.

Witnesses:
MAX WERNICKE,
B. ROI.